United States Patent
Spuller et al.

(10) Patent No.: US 9,248,594 B2
(45) Date of Patent: Feb. 2, 2016

(54) INJECTION MOLDING APPARATUS WITH INTEGRATED HOT RUNNER SYSTEM

(71) Applicant: Otto Männer Innovation GmbH, Bahlingen (DE)

(72) Inventors: Swen Spuller, Forchheim (DE); Fabian Ehret, Herbolzheim (DE)

(73) Assignee: Otto Männer Innovation GmbH, Bahlingen (DE)

( * ) Notice: Subject to any disclaimer, the term of this patent is extended or adjusted under 35 U.S.C. 154(b) by 0 days.

(21) Appl. No.: 14/698,601

(22) Filed: Apr. 28, 2015

(65) Prior Publication Data

US 2015/0231807 A1     Aug. 20, 2015

Related U.S. Application Data

(63) Continuation-in-part of application No. 13/655,344, filed on Oct. 18, 2012, now Pat. No. 9,017,063.

(51) Int. Cl.
| | |
|---|---|
| B29C 45/22 | (2006.01) |
| B29C 45/20 | (2006.01) |
| B29C 45/27 | (2006.01) |
| B29C 45/28 | (2006.01) |
| B29C 45/00 | (2006.01) |

(52) U.S. Cl.
CPC .............. B29C 45/20 (2013.01); B29C 45/281 (2013.01); *B29C 45/2725* (2013.01); *B29C 45/2806* (2013.01); *B29C 2045/0094* (2013.01); *B29C 2045/2813* (2013.01)

(58) Field of Classification Search
CPC .......................... B29C 45/2806; B29C 45/2725
USPC ................................... 425/562, 564, 566, 572
See application file for complete search history.

(56) References Cited

U.S. PATENT DOCUMENTS

| | | | |
|---|---|---|---|
| 2,828,507 | A | 4/1958 | Strauss |
| 2,865,050 | A | 12/1958 | Strauss |
| 2,878,515 | A | 3/1959 | Strauss |
| 5,773,038 | A | 6/1998 | Hettinga |

(Continued)

FOREIGN PATENT DOCUMENTS

| | | |
|---|---|---|
| DE | 3919492 A1 | 12/1990 |
| DE | 10108632 A1 | 7/2002 |

(Continued)

OTHER PUBLICATIONS

DE 102011116053.5 Office Action Jun. 28, 2012.

*Primary Examiner* — Tim Heitbrink
(74) *Attorney, Agent, or Firm* — McAndrews Held & Malloy, Ltd.

(57) ABSTRACT

A hot runner injection molding apparatus may comprise a machine injection unit with a machine nozzle, a first machine platen adjacent the machine nozzle, and a hot runner system. The first machine platen may include a multi-segment chamber. The hot runner system may include a movable plate, a manifold, a plurality of hot runner nozzles, and one or more actuators. The movable plate may be located in a first segment of the multi-segment chamber. The manifold and the plurality of hot runner nozzles may be located in a second segment of the multi-segment chamber. The one or more actuators may be located in a third segment of the multi-segment chamber. The movable plate may drive the plurality of valve pins and the manifold. The one or more actuators may drive the movable plate.

20 Claims, 7 Drawing Sheets

(56) References Cited

U.S. PATENT DOCUMENTS

| | | | |
|---|---|---|---|
| 6,530,777 B1 | 3/2003 | Ganz et al. | |
| 7,217,384 B2 * | 5/2007 | Tanaka | B29C 45/2756 425/572 |
| 7,553,150 B2 | 6/2009 | Kaushal et al. | |
| 7,722,351 B2 | 5/2010 | Feick et al. | |
| 2002/0121713 A1 * | 9/2002 | Moss | B29C 45/27 425/566 |
| 2005/0079242 A1 | 4/2005 | Schmidt | |
| 2005/0200048 A1 * | 9/2005 | Fujii | B29C 45/2806 425/564 |
| 2005/0226045 A1 | 10/2005 | Goinski | |
| 2010/0183763 A1 * | 7/2010 | Babin | B29C 45/27 425/564 |
| 2013/0273193 A1 | 10/2013 | Galt | |
| 2014/0178525 A1 * | 6/2014 | Babin | B29C 45/322 425/564 |

FOREIGN PATENT DOCUMENTS

| | | |
|---|---|---|
| DE | 10297634 T5 | 3/2005 |
| DE | 102009048796 A1 | 5/2010 |
| GB | 2394689 A | 5/2004 |
| WO | 2007041865 A1 | 4/2007 |

* cited by examiner

INJECTION MOLDING APPARATUS WITH INTEGRATED HOT RUNNER SYSTEM

CROSS-REFERENCE TO RELATED APPLICATIONS

This application is a continuation-in-part of U.S. patent application Ser. No. 13/655,344, filed Oct. 12, 2012, now U.S. Pat. No. 9,017,063, which claims benefit of priority from German (DE) Patent Application No. 10 2011 116 053.5, filed Oct. 18, 2011, the contents of both of which are herein incorporated by reference in their entirety.

FIELD OF THE INVENTION

The invention relates to an injection molding apparatus for injection molding of small and miniature plastic parts.

BACKGROUND OF THE INVENTION

In such machines, molten material is fed from the screw barrel of an extruder via a manifold sprue bushing in an inlet melt channel of a hot runner system and there in a plurality of output melt channels fluidically connected to and downstream from the inlet melt channel.

Such an injection molding apparatus is known from the brochure "manner micro-man 50" of Otto Manner GmbH, which is made available on the company website http://www.maenner-group.com and whose content is herein incorporated by reference.

Known injection molding machines have a first machine platen, fixed to the machine base and a second machine platen which is movable with respect to the first machine platen. The first machine platen has an opening for the machine nozzle of the machine injection unit. A mold plate is mounted on the surface of the first machine platen opposite to the second machine platen. A hot runner manifold with hot runner nozzles is mounted on the surface of the mold plate. Moving means for the actuators of the hot runner nozzles are often mounted on the mold plate or on the machine platen.

This construction shows a large area of contact between the machine platen and the mold plate and between the mold plate and the hot runner manifold which assists heat conduction between these components resulting in energy loss in the hot runner system and thermal expansion of the machine platen. Further, the actuation means of valve pins are located behind the hot runner nozzles which results in a lower precision in parallel actuation of the nozzles resulting from positioning of the actuators laterally next to the mold plate and hot runner system. A positioning of the actuation means behind the nozzles also results in the need of a long distance manifold sprue bushing and inlet melt channel respectively.

It is therefore the object of the present invention to provide an injection molding apparatus improving the specified drawbacks for producing high quality small and miniature plastic parts.

An injection molding apparatus improving at least some of the specified drawbacks is described in the German patent application DE 10 2011 116 053. The content of this application is also incorporated herein by reference.

The invention relates to an injection molding machine for producing injection-molded parts having an injection station comprising an injection nozzle arranged on a machine platen for discharging melt, wherein a molding tool is arranged on the machine platen which defines a cavity corresponding to the injection-molded part, wherein the molding tool comprises at least one first tool element which is stationary relative to the machine platen and one second tool element which is displaceable relative to the first tool element between an open and a closed position by means of a closing device, and wherein the injection nozzle is connected to at least one inlet of the cavity arranged on the first tool element by means of a hot runner system.

This type of injection molding machine is known from DE 102005015242 A1. It comprises a molding tool having two tool elements which define a cavity adjoining both tool elements for producing an injection-molded part. A first tool element is fixed on a first machine platen arranged stationary to the injection nozzle and a second tool element is fixed on a second machine platen which is movable to open and close the molding tool on the first machine platen toward and away from same. The first tool element has an indentation on its rear side facing the injection nozzle in which a hot runner system is arranged which connects the injection nozzle to the inlets provided on the cavity for the melt. The hot runner system is thermally insulated from the first tool element and the machine platen. The hot runner system has the advantage that the melt within the hot runner system remains capable of flowing when the injection-molded part solidifies such that virtually no residual sprue remains on the injection-molded parts after they're removed from the molding tool. This enables omitting the production step of separating the sprue from the injection-molded part. The hot runner system moreover has the advantage of reducing the plastic material used during the injection molding because the melt remaining in the hot runner system can be used for injection molding at least one further injection-molded part. Yet the injection molding machine does have the disadvantage of being of relatively large dimensions. Further disadvantageous is that the first, so-called hot molding tool is still relatively complex and expensive.

SUMMARY OF THE INVENTION

To overcome these drawbacks a hot runner injection molding apparatus is proposed comprising a machine injection unit with a machine nozzle, a first machine platen fixed to the machine base, a second machine platen which is movable with respect to the first machine platen, a hot runner manifold having an inlet melt channel and a plurality of output melt channels, a plurality of hot runner nozzles associated with the manifold output melt channels, a movable valve pin plate connected to a plurality of valve pins, wherein the valve pins are associated with the hot runner nozzles at least one moving means for moving the movable valve pin plate between at least two positions, whereupon the valve pins are displaced between at least two positions relative to the valve seat of the hot runner nozzle to control the amount of a molten material injected into a mold cavity through the manifold and the hot runner nozzles. The first machine platen of the hot runner injection molding apparatus has a chamber within which the hot runner manifold, the movable valve pin plate and the moving means for moving the movable plate are arranged.

According to one embodiment of the present disclosure, a hot runner injection molding apparatus may comprise a machine injection unit including a machine nozzle, and a first machine platen adjacent the machine nozzle. The first machine platen may include a multi-segment chamber that accommodates at least part of a hot runner system. The hot runner system may include: a movable plate located in a first segment of the multi-segment chamber, a plurality of valve pins and a manifold located in a second segment of the multi-segment chamber, and one or more actuators located in at least a third segment of the multi-segment chamber. The movable plate may drive the plurality of valve pins and the manifold, and the one or more actuators may drive the movable plate.

It is therefore the object to provide an injection molding machine of the type cited at the outset which allows for compact dimensions.

This object is accomplished by the machine platen comprising an inner cavity and at least one section of the hot runner system being arranged within the inner cavity. Doing so advantageously enables the first tool element to be of correspondingly compact design.

A hot runner system is to be understood as a body disposed between the injection nozzle and the mold cavity which has at least one passage for the melt to be introduced into the mold cavity, said passage thermally insulated from the molding tool and/or heatable such that the melt within the at least one passage remains capable of flowing, or molten respectively, upon the solidifying of the injection-molded part within the cavity.

In one advantageous embodiment of the invention, the hot runner system comprises a manifold having an inlet connected to the injection nozzle and a plurality of outlets each respectively connected to at least one cavity inlet, wherein the manifold is arranged in the inner cavity of the machine platen. The injection molding machine then allows the producing of even complex and/or delicately formed injection-molded parts. There is then also the further possibility of being able to produce a plurality of injection-molded parts during just one single injection molding process.

In one advantageous embodiment of the invention, the hot runner system comprises at least one hot runner in which a valve comprising a closure element which is displaceable relative to a valve seat is arranged, said closure element being in drive connection with at least one actuator, wherein the actuator is arranged in the inner cavity of the machine platen. Doing so enables sprue patches to be virtually completely prevented, whereby the injection-molded parts can be manufactured at even better quality and contouring accuracy.

However, other embodiments are also conceivable in which the at least one hot runner can be designed as an open hot runner. The hot runner system can thereby be manufactured at even lower cost and have even more compact dimensions. An open design to the hot runner can be advantageous particularly in the case of a smaller hot runner cross section. An open hot runner can also be used for injection-molded parts having lower contouring accuracy standards.

In another design of the invention, the valve seat is connected by means of at least two channels to inlets of the cavity spaced apart from each other. It is thereby even possible for these channels to be configured as "cold" channels in which the melt contained therein solidifies together with the injection-molded part when the molding tool is cooled so that the injection-molded part can be removed. It is thus also possible for at least one hot runner and at least one cold channel to be combined in the inner cavity of the machine platen.

In one expedient embodiment of the invention, the hot runner system comprises a plurality of hot runners, in each of which at least one respective valve is arranged, whereby each valve comprises a respective axially displaceable, needle-shaped closure element, wherein the closure elements are arranged on a carrier plate which is displaceable in the axial direction of the closure elements relative to the machine platen for the synchronous actuating of the closure elements by means of the at least one actuator, and wherein the carrier plate is disposed in the inner cavity of the machine platen. This enables a plurality of valves to be actuated at the same time by the displacing of the carrier plate within the machine platen.

It is advantageous for the actuator to be configured as a piston which is preferably arranged in a section of the machine platen located between the carrier plate and the first tool element. Doing so enables the space located laterally next to the hot runner system between the carrier plate and the first tool element of the molding tool to be used to accommodate the piston. The piston can be pneumatically and/or hydraulically operated.

The manifold is expediently distanced from the machine platen by an air gap. Doing so allows the manifold to be easily thermally uncoupled from the machine platen and the first tool element arranged thereon.

In one preferential design of the invention, the manifold is detachably connectable to the machine platen, preferably such that a clamping surface for the molding tool turned away and opposite the injection nozzle comprises an opening into which the manifold can be inserted and through which the manifold can be removed. The manifold is then easily accessible, e.g. for performing service or maintenance on the manifold, after the molding tool has been removed.

The molding tool can be expediently fixed to the clamping surface by means of at least one clamping element, whereby the manifold is connected to the first tool element at its rear side facing the clamping surface. The manifold can then be removed from the machine platen together with the stationary first tool element after the at least one clamping element is loosened and be replaced by the appropriate replacement part as needed.

In a further development of the invention, the injection molding machine has, additionally to the injection station, at least one further station and a transport device with at least one transport route connecting the stations on which the second tool element can be moved from one station to another station, if applicable with an injection-molded part in the cavity. It is thereby possible to process the injection-molded parts at multiple stations at the same time. The injection molding machine thus enables high productivity.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

The following will draw on the figures in defining an embodiment of the invention in greater detail. Shown are.

The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

Figure 1:
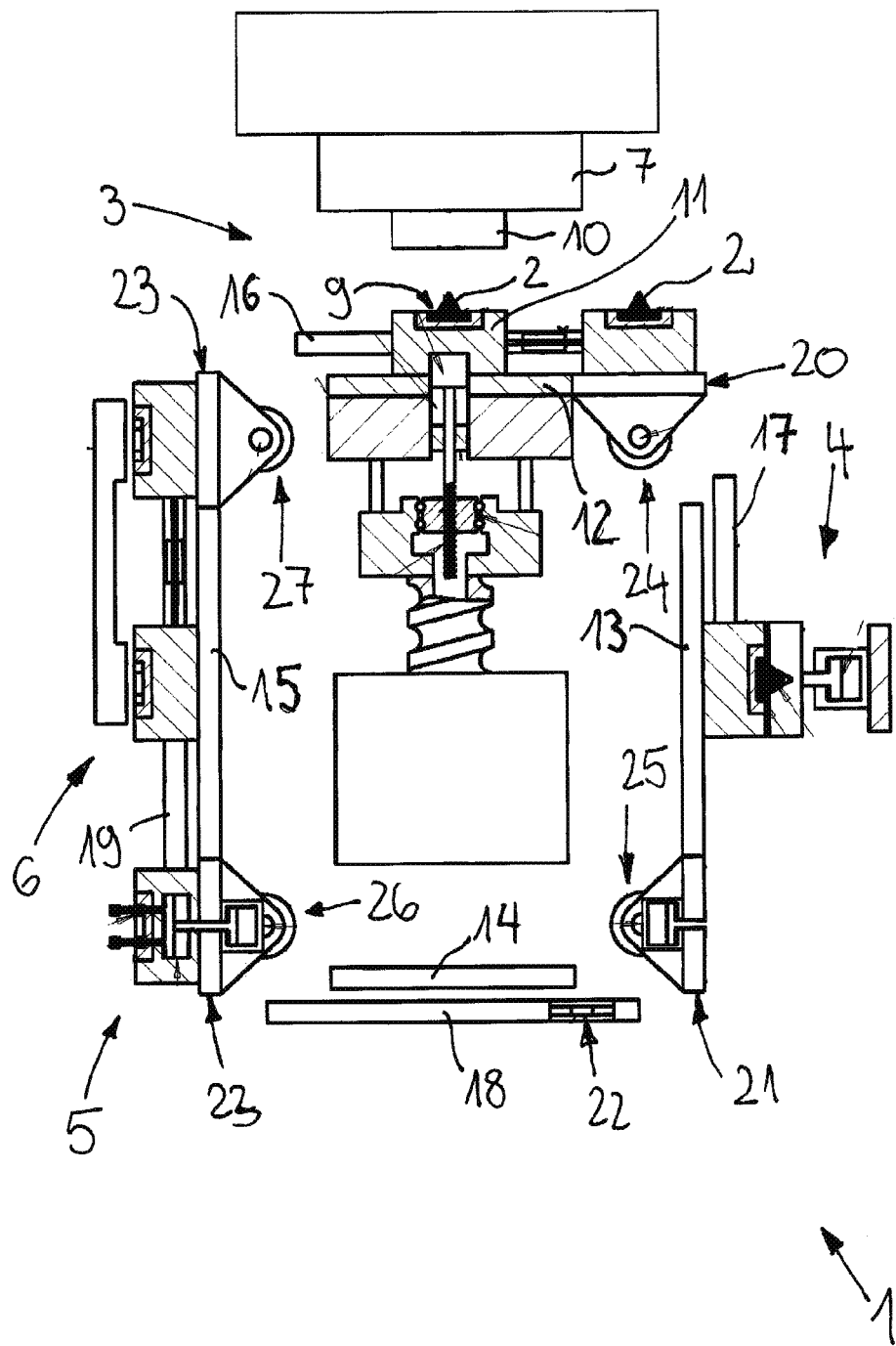
FIG. 1 shows a schematic plan view depiction of an injection molding machine according to the invention.
Figure 2:
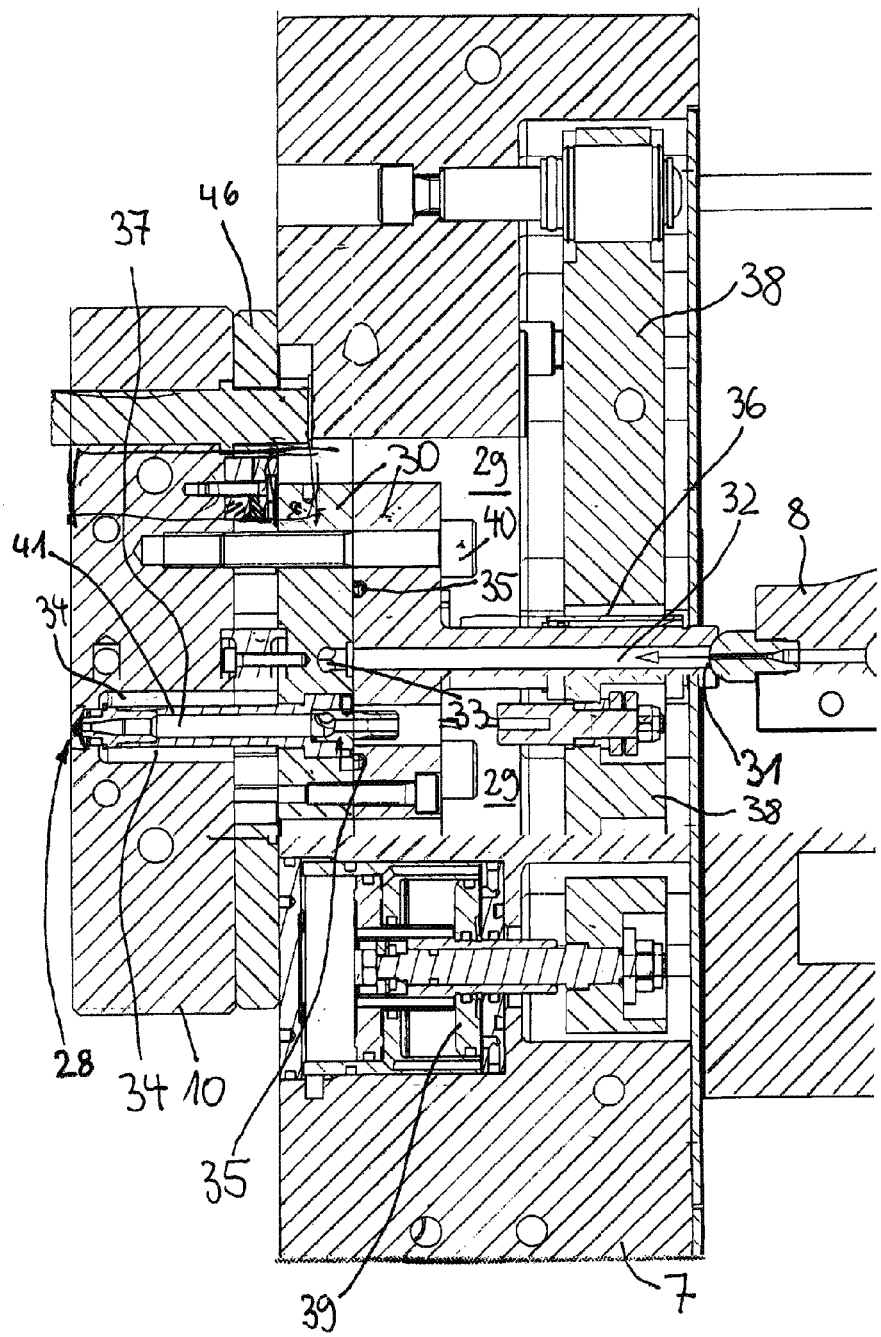
FIG. 2 shows a partial cross section through a mold half of a molding tool arranged on a machine platen of an injection molding machine.

Reference is made to FIG. 1 and FIG. 2 which are described in more detail in the German patent application DE 10 2011 116 053.

FIG. 1 shows a micro injection molding apparatus 1 for manufacturing miniature molded parts 2 with a machine injection unit 3, a cooling station 4, a part removal station 5 and a heating station 6. The machine injection unit 3 has a machine nozzle 8 arranged at the machine platen 7 for feeding melt.

A first mold half 10 is connected to the machine platen 7. The first and second mold halves 10, 11 are moveable in an open-close movement. FIG. 1 shows an open position.

FIG. 1 shows a transposition system, with a closed transposition way 12 connecting at least one of the stations 3, 4, 5, 6. The second mold half 12 is movable along the transposition way 12, 13, 14, 15. Thereby the molded parts 2 can be handled at more than one station in parallel.

FIG. 2 shows a view of an inventive machine platen 7 of a first embodiment in cross section. Via a hot runner system 50, the machine nozzle 8 is connected to gates 28 of the cavity 9. The gates 28 are located at a first mold plate 10. The hot runner system 50 is arranged in a chamber 29 of the machine platen 7. The hot runner system 50 comprises a manifold 30, which has a melt inlet 31 facing the machine nozzle 8. The manifold 30 is connected via a hot runner 32 to a furcation 33. Further hot runner channels 34 lead from the furcation 33 to the gates 28. By means of a clearance 43 the manifold 30 is spaced from the machine platen 7.

Within the manifold 30 heating elements 35 are arranged at the hot runner 32 leading from the machine nozzle 8 to the furcation 33 and a further heating element 36 is arranged for tempering the manifold 30.

Figure 3:
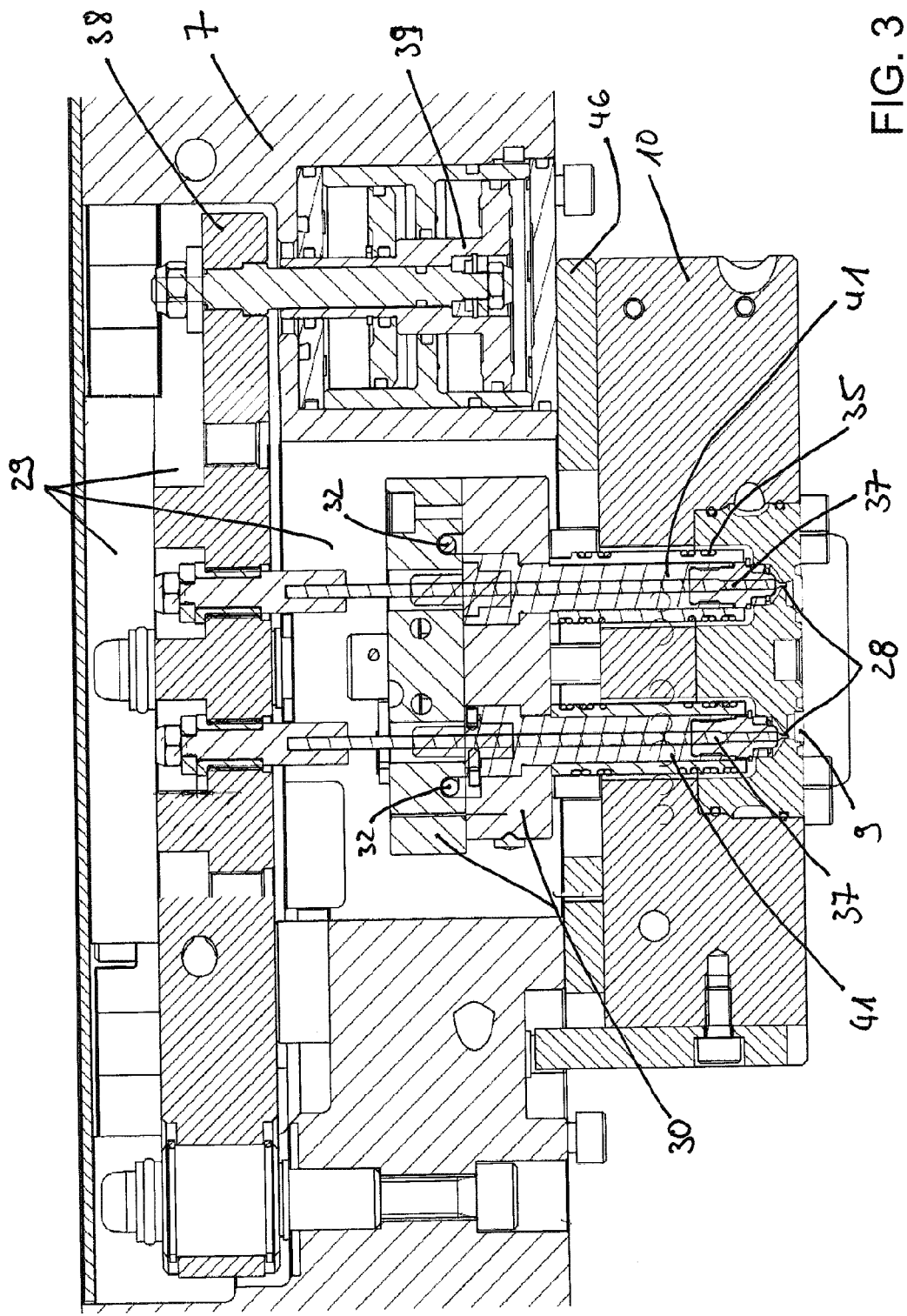
FIG. 3 shows a view of an inventive machine platen of a second embodiment in cross section.

FIG. 3 shows a view of an inventive machine platen 7 of a second embodiment in cross section. The hot runner system 50 is arranged in a chamber 29 of the machine platen 7. The hot runner system 50 comprises a manifold 30. By means of a clearance 43 the manifold 30 is spaced from the machine platen 7.

At each hot runner leading from furcation 33 to a cavity 9, a hot runner nozzle 41 with a valve and a valve pin 37 are arranged. The valve pin 37 is axially movable and thereby positionable against a valve seat close to the cavity 9.

The valve pins 37 are arranged in parallel to each other and fixed to a movable valve pin plate 38 with their ends opposite to the valve seat. The movable valve pin plate 38 is arranged within a chamber 29 in the machine platen 7. With moving means 39 the movable valve pin plate 38 is movable relative to the machine platen 7 in an axially direction of the valve pins 37. In this way the valves of the nozzles 41 can be opened and closed synchronously.

The moving means 39 are positioned lateral next to the inner chamber 29 within the machine platen 7. The recesses for the moving means are located in an area of the machine platen 7 between the movable valve pin plate 38 and the mold plate 46.

Figure 4:
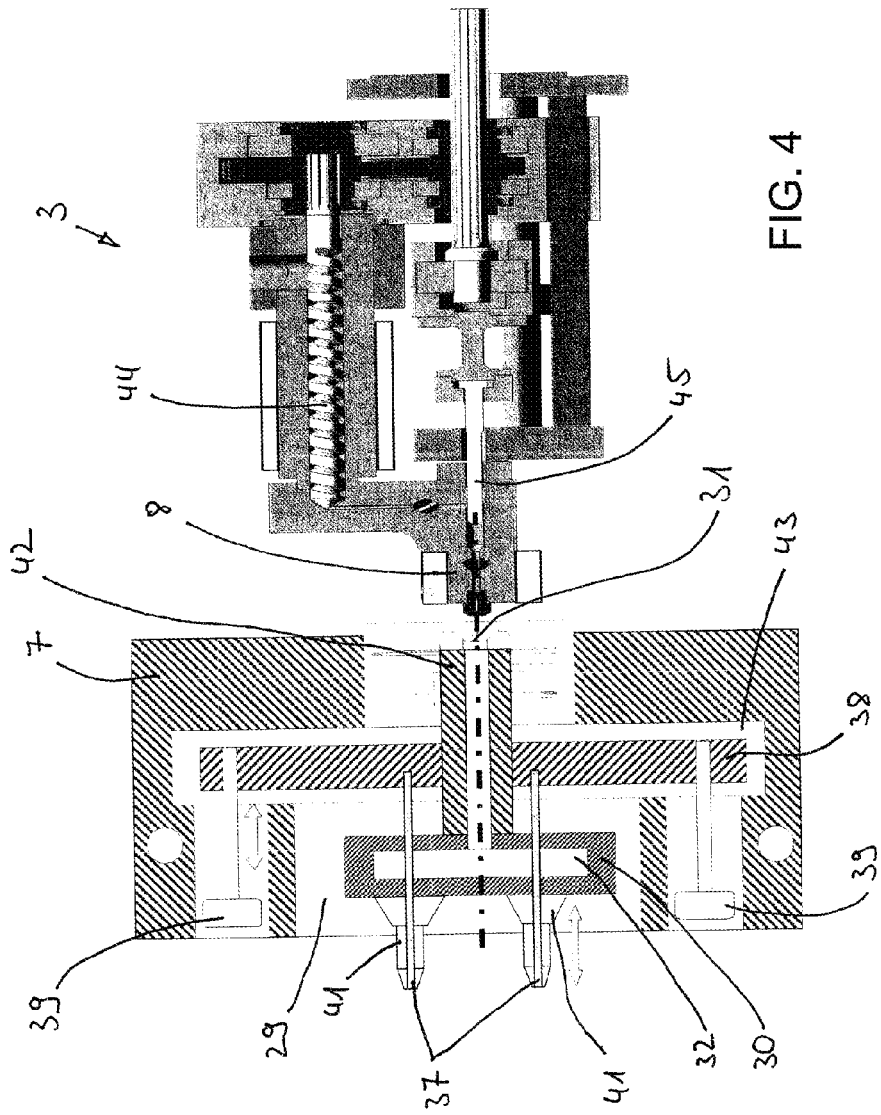
FIG. 4 shows a more schematic view of the inventive machine platen of FIG. 3 in cross section with a machine injection unit.

FIG. 4 shows a more schematic view of the inventive machine platen 7 of FIG. 3 in cross section with a machine injection unit 3. The machine injection unit 3 has a screw barrel 44 with feeds molten material to an injection plunger 45 of a machine nozzle 8 which is positionable to the melt inlet 31 and bushing 42 of the hot runner system 50 of the injection molding apparatus 1.

The hot runner system 50 comprises a manifold 30, which is connected via a hot runner 32 and hot runner nozzles 41 to gates of mold cavities. The hot runner system is arranged in a chamber 29 of the machine platen 7. By means of a clearance 43 the manifold 30 is spaced from the machine platen 7.

Figure 5A:
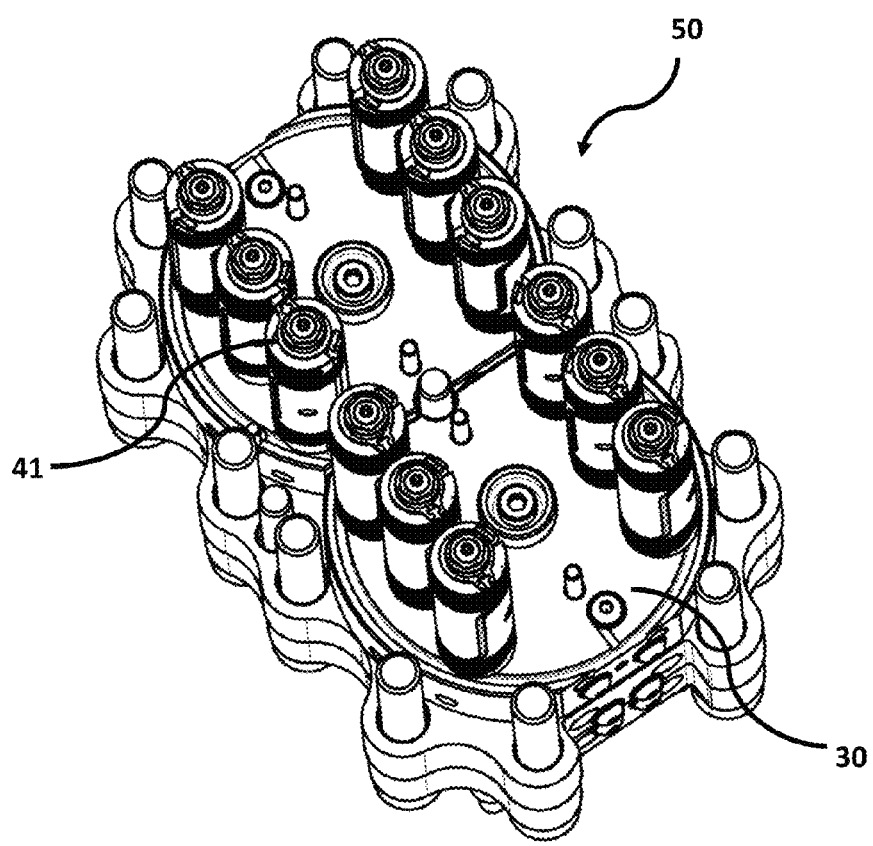
FIG. 5a shows a view of a hot runner system.
Figure 5B:
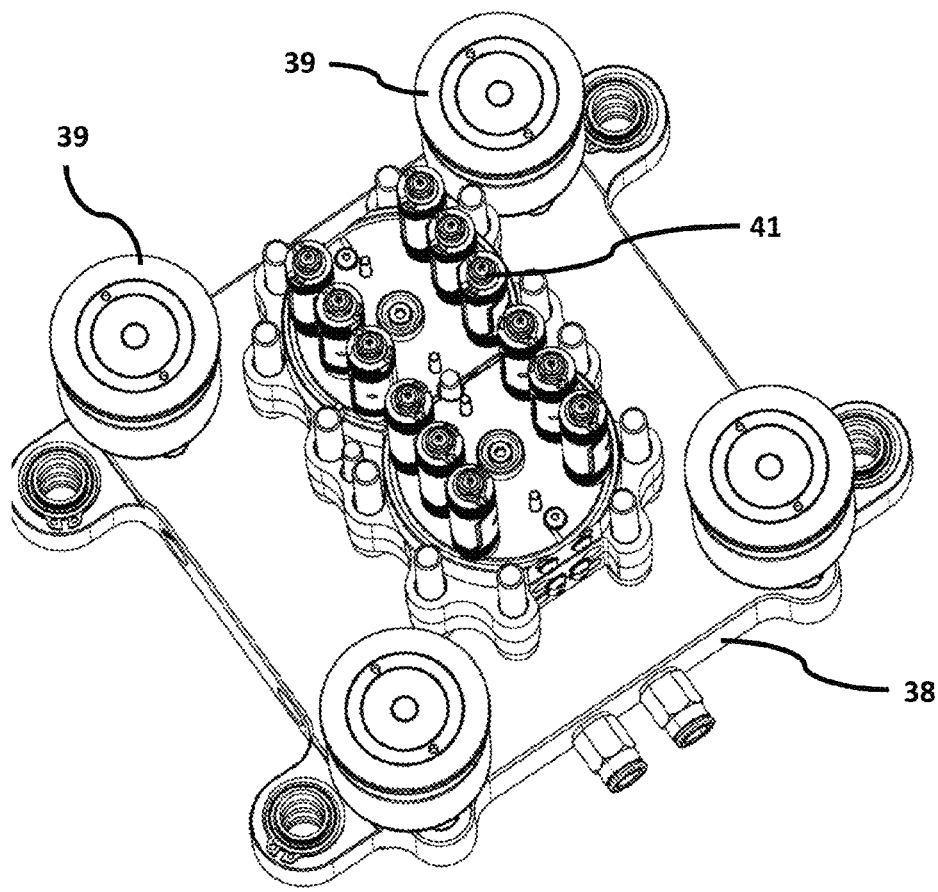
FIG. 5b shows a view of the hot runner system, a moveable pin plate, and four pistons.
Figure 5C:
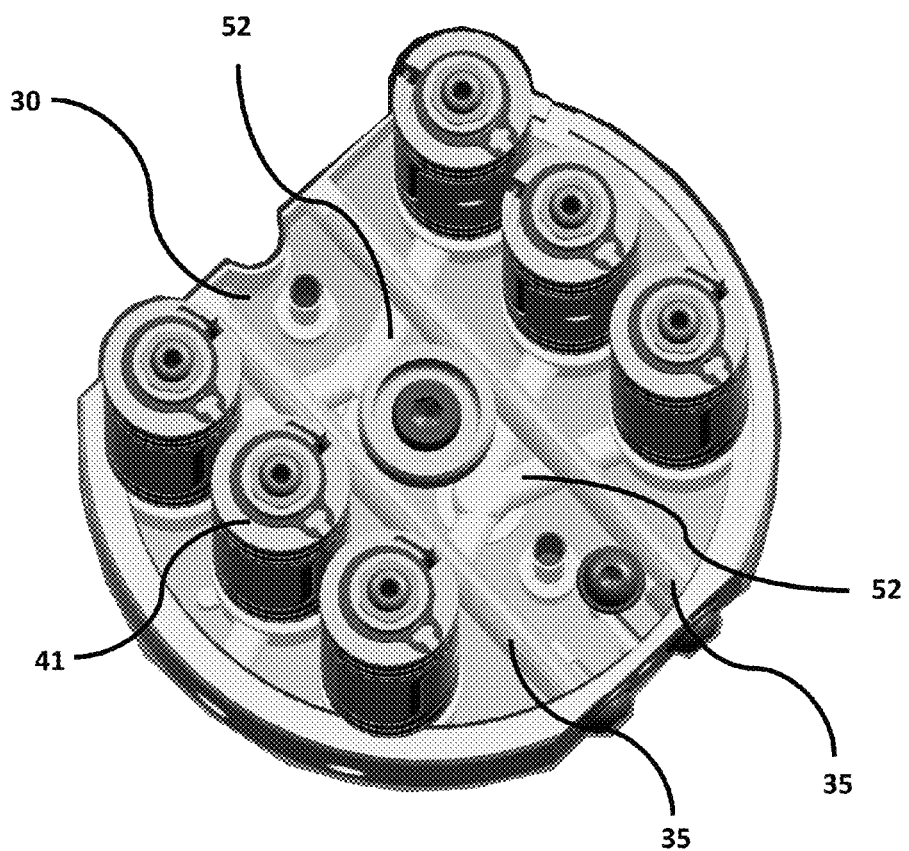
FIG. 5c shows a view of one half of the hot runner system, showing a heater and manifold channels within a manifold.

FIGS. 5a to 5c show example embodiments of a hot runner system 50. The hot runner system 50 may comprise a manifold 30 and hot runner nozzles 41. The hot runner system may be connected to a movable valve pin plate 38. The movable valve pin plate 38 may drive the valve pins 37. Pistons 39 may drive the movable valve pin plate 38 and the valve pins 37. The manifold 30 may comprise a manifold heater 35 and one or more output melt channels 52. Optionally, the manifold heater 35 may be a cartridge heater. Optionally, the one or more output melt channels 52 may be Y-shaped.

The chamber 29 may be a multi-segment chamber. A movable valve pin plate 38 may be located in a first segment of the chamber 29. A plurality of valve pins 37 may be located in a second segment of the chamber 29. One or more pistons 39 may be located in a third segment of the chamber 29.

As can be recognized from FIG. 1, an injection molding machine 1 for 10 producing injection-molded parts 2 comprises an injection station 3, a cooling station 4, an extraction station 5 and a heating station 6.

The injection station 3 has an injection nozzle 8 arranged on a machine platen 7 for discharging melt. The melt can be conveyed to the injection nozzle 8 by means of a known per se screw conveyor not shown in any greater detail in the drawing.

A molding tool is arranged on the machine platen 7 which defines a cavity 9 corresponding to the injection-molded part 2. The molding tool comprises a stationary first tool element 10 connected to an injection nozzle 8 and a displaceable second tool element 11. The tool elements 10, 11 are respectively configured as mold halves. They can be moved toward and away from each other and brought into an open position as depicted in FIG. 1 as well as into a closed position. In the closed position, the tool elements 10, 11 can be pressed together via clamping means not shown in the drawing in any greater detail.

It is also recognizable from FIG. 1 that the injection molding machine 1 has a transport device which comprises at least one closed transport route 12, 13, 14, 15 connecting the stations 3, 4, 5, 6. The second tool element 11 can be moved along the transport route 12, 13, 14, 15 from one station 3, 4, 5, 6 to another station 4, 5, 6, 3, with an injection-molded part 2 in the cavity 9 as applicable. The injection-molded parts 2 can thereby be processed at multiple stations at the same time.

The transporting of the second tool element 11 ensues by means of rodless pneumatic cylinders 16, 17, 18, 19, whereby a first pneumatic cylinder 16 assumes the transport of second tool elements 11 arranged on a first slide rail 20, a second pneumatic cylinder 17 assumes the transport of second tool elements 11 arranged on a second slide rail 21, a third pneumatic cylinder 18 assumes the transport of second tool elements 11 arranged on the third slide rail 22 and a fourth pneumatic cylinder 19 assumes the transport of second tool elements 11 arranged on a fourth slide rail 23. Slide rails 20, 21, 22, 23 arranged adjacently next to one another are respectively connected together by means of rotary drives 24, 25, 26, 27.

It is recognizable from FIG. 2 that the injection nozzle 8 is connected by means of a hot runner system 50 to inlets 28 of the cavity 9 arranged on the first tool element 10. The hot runner system 50 is arranged in an inner cavity 29 of the machine platen 7. The hot runner system 50 comprises a manifold 30 having an inlet 31 facing the injection nozzle 8 which is connected to a branch point 33 by means of a hot runner 32.

Further hot runners 34 lead from the branch point 33 to the individual inlets 28. A clearance 43 distances the manifold from the machine platen 7.

Heating elements 35 are arranged in the interior of the manifold 30 which keep the manifold 30 at a temperature at which the melt therein remains molten or capable of flowing respectively. The heating elements 35 can be configured as electrical heat conductors. A further heating element 36 is provided on the hot runner 32 leading from the injection nozzle 8 to the branch point 33 for thermoregulating the manifold 30.

A respective valve comprising a needle-shaped closure element 37 which is axially displaceable and can be positioned against a valve seat in close proximity to the cavity 9 is provided in each of the individual hot runners leading from the branch point 33 to the cavity 9.

The closure elements 37 run parallel to one another and are fixed to a carrier plate 38 arranged within the inner cavity 29 of the machine platen 7 by their end remote of the valve seat. The carrier plate 38 is displaceable in the axial direction of the closure elements 37 relative to the machine platen 7 by means of pistons 39. The valves can thereby be opened and closed synchronously.

The pistons 39 are displaceable within bores positioned laterally next to the inner cavity 29 in the machine platen 7. The bores are arranged in a section of the machine platen 7 located between the carrier plate 38 and the first tool element 10.

The manifold 30 is detachably connected to the first tool element 10 by means of screws 40 and can be removed from the machine platen 7 together with same.

The invention claimed is:

1. A hot runner injection molding apparatus comprising:
   a machine injection unit including a machine nozzle; and
   a first machine platen adjacent the machine nozzle, the first machine platen including a multi-segment chamber that accommodates at least part of a hot runner system;
   wherein the hot runner system includes a movable plate located in a first segment of the multi-segment chamber;
   wherein the hot runner system includes a plurality of valve pins and a manifold located in a second segment of the multi-segment chamber;
   wherein the hot runner system includes one or more actuators located in at least a third segment of the multi-segment chamber;
   wherein the movable plate drives the plurality of valve pins and the manifold; and
   wherein the one or more actuators drive the movable plate.

2. The hot runner injection molding apparatus of claim 1, wherein the manifold comprises a manifold heater.

3. The hot runner injection molding apparatus of claim 2, wherein the manifold heater is a cartridge heater.

4. The hot runner injection molding apparatus of claim 1, wherein the manifold comprises one or more output melt channels.

5. The hot runner injection molding apparatus of claim 4, wherein the one or more output melt channels are Y-shaped.

6. The hot runner injection molding apparatus of claim 1, wherein the one or more actuators are pistons.

7. The hot runner injection molding apparatus of claim 1, wherein the manifold is spaced from the first machine platen by a clearance.

8. The hot runner injection molding apparatus of claim 1, wherein the manifold is detachably connectable to the first machine platen.

9. The hot runner injection molding apparatus of claim 1, further comprising a molding tool, wherein the manifold is detachably connectable to the molding tool.

10. The hot runner injection molding apparatus of claim 9, wherein the molding tool comprises first and second tool elements, the first tool element being fixed and the second tool element being movable.

11. A hot runner injection molding machine comprising:
    an injection station, the injection station comprising:
       a machine injection unit including a machine nozzle, and
       a first machine platen adjacent the machine nozzle, the first machine platen including a multi-segment chamber that accommodates at least part of a hot runner system,
       wherein the hot runner system includes a movable plate located in a first segment of the multi-segment chamber,
       wherein the hot runner system includes a plurality of valve pins and a manifold located in a second segment of the multi-segment chamber,
       wherein the hot runner system includes one or more actuators located in at least a third segment of the multi-segment chamber,
       wherein the movable plate drives the plurality of valve pins and the manifold, and
       wherein the one or more actuators drive the movable plate;
    at least one further station; and
    a transport device connecting the stations.

12. The hot runner injection molding apparatus of claim 1, wherein the manifold comprises a manifold heater.

13. The hot runner injection molding apparatus of claim 12, wherein the manifold heater is a cartridge heater.

14. The hot runner injection molding apparatus of claim 11, wherein the manifold comprises one or more manifold melt channels.

15. The hot runner injection molding apparatus of claim 14, wherein the one or more manifold melt channels are Y-shaped.

16. The hot runner injection molding apparatus of claim 11, wherein the one or more actuators are pistons.

17. The hot runner injection molding apparatus of claim 11, wherein the manifold is spaced from the first machine platen by a clearance.

18. The hot runner injection molding apparatus of claim 11, wherein the manifold is detachably connectable to the first machine platen.

19. The hot runner injection molding apparatus of claim 11, further comprising a molding tool, wherein the manifold is detachably connectable to the molding tool.

20. The hot runner injection molding apparatus of claim 19, wherein the molding tool comprises first and second tool elements, the first tool element being fixed and the second tool element being movable.

* * * * *